(12) United States Patent
Loebach

(10) Patent No.: US 10,174,997 B2
(45) Date of Patent: Jan. 8, 2019

(54) CROP DRYING SYSTEM

(71) Applicant: David R Loebach, Nampa, ID (US)

(72) Inventor: David R Loebach, Nampa, ID (US)

(*) Notice: Subject to any disclaimer, the term of this patent is extended or adjusted under 35 U.S.C. 154(b) by 235 days.

(21) Appl. No.: 15/401,093

(22) Filed: Jan. 8, 2017

(65) Prior Publication Data

US 2017/0115061 A1  Apr. 27, 2017

Related U.S. Application Data

(63) Continuation-in-part of application No. 13/871,494, filed on Apr. 26, 2013.

(51) Int. Cl.
| | |
|---|---|
| F26B 23/10 | (2006.01) |
| F26B 3/06 | (2006.01) |
| F26B 21/04 | (2006.01) |
| F26B 25/14 | (2006.01) |
| F24F 3/14 | (2006.01) |
| A23L 3/40 | (2006.01) |
| A23B 7/02 | (2006.01) |
| B01D 53/26 | (2006.01) |
| F25B 13/00 | (2006.01) |

(52) U.S. Cl.
CPC ............ *F26B 23/10* (2013.01); *A23B 7/0205* (2013.01); *A23L 3/40* (2013.01); *B01D 53/265* (2013.01); *F24F 3/1405* (2013.01); *F25B 13/00* (2013.01); *F26B 3/06* (2013.01); *F26B 21/04* (2013.01); *F26B 25/14* (2013.01); *B01D 2258/0275* (2013.01); *F25B 2313/02741* (2013.01); *Y02P 60/853* (2015.11)

(58) Field of Classification Search
CPC .. F26B 21/04; F26B 23/10; F26B 3/06; F24F 3/1405
See application file for complete search history.

(56) References Cited

U.S. PATENT DOCUMENTS

| | | |
|---|---|---|
| 4,043,051 A | 8/1977 | Lussenden |
| 4,196,526 A | 4/1980 | Berti |
| 4,205,456 A | 6/1980 | Hogan |
| 4,295,282 A | 10/1981 | Fox |
| 4,337,584 A | 7/1982 | Johnson |
| 4,603,489 A | 8/1986 | Goldberg |
| 5,119,571 A | 6/1992 | Beasley |
| 5,343,632 A | 9/1994 | Dinh |

(Continued)

FOREIGN PATENT DOCUMENTS

WO    WO8605575    9/1986

*Primary Examiner* — Filip Zec
(74) *Attorney, Agent, or Firm* — Sean D. Burdick

(57) ABSTRACT

A moisture removal system having a crop drying enclosure for holding a crop product to be dried. A closed loop air circulation system is provided which includes a moisture removal enclosure for removing moisture from circulating air along with air ducting operatively connecting the moisture removal enclosure to the crop drying enclosure air inlet to form a closed loop moisture removal air system. A heat pump system, including a compressor, a first heat exchanger capable of operation as a condenser, along with two additional heat exchangers, each capable of operating as either a condenser or evaporator are positioned within the moisture removal enclosure, to remove excess moisture from the circulating air without the addition or extraction of heat from the ambient air temperature.

7 Claims, 3 Drawing Sheets

(56) References Cited

U.S. PATENT DOCUMENTS

| | | | |
|---|---|---|---|
| 5,675,906 | A | 10/1997 | Li et al. |
| 5,709,041 | A | 1/1998 | Tarplee |
| 6,202,319 | B1 | 3/2001 | Bening |
| 7,055,262 | B2 | 6/2006 | Goldberg |
| 7,469,486 | B2* | 12/2008 | Tamura .................. D06F 58/02 34/474 |
| 7,624,514 | B2 | 12/2009 | Kurobe |
| 8,347,520 | B2 | 1/2013 | Kuwabara |
| 2005/0086824 | A1 | 4/2005 | Ono |
| 2005/0198852 | A1 | 9/2005 | Ono |
| 2007/0017113 | A1* | 1/2007 | Scharpf ................ D06F 58/206 34/86 |
| 2007/0107255 | A1 | 5/2007 | Tamura |
| 2008/0289212 | A1* | 11/2008 | Moon .................... D06F 58/206 34/267 |
| 2010/0170101 | A1 | 7/2010 | Taniguchi |
| 2010/0199511 | A1 | 8/2010 | Ahn |
| 2012/0272689 | A1 | 11/2012 | Elger |
| 2013/0232813 | A1 | 9/2013 | Heo |

* cited by examiner

CROP DRYING SYSTEM

PRIORITY/CROSS-REFERENCE TO RELATED APPLICATIONS

This application is a Continuation in Part, and claims the benefit of U.S. application Ser. No. 13/871,494, filed Apr. 26, 2013, the disclosure of which is incorporated by reference.

TECHNICAL FIELD

The presently disclosed technology relates to dehumidification systems, and more particularly to systems directed at removing moisture from agricultural or other moisture-laden products in a closed air circulation loop without the addition of significant heat to the drying air.

BACKGROUND

Hundreds of millions of tons of wheat, corn, soybean, rice and other grains such as sorghum, sunflower seed, rapeseed, barley, oats and others, are dried in grain dryers. This is done for purposes of increasing allowable storage time, to maintain increased crop quality, and to reduce spoilage from fungi or molds, or insect damage.

While it is hard to generalize the moisture content of a typical harvest crop, grains are likely to have a moisture content of 17 to 30% by weight. If the grain is to be used for seed, that moisture content must be reduced to 9 to 12% to minimize the loss of germination during long term storage until the next planting season. The same is true for edible or commercial crops, especially if it is anticipated that the crop will be held in long term storage such as in a grain elevator.

The temperature and moisture content of the crop to be dried will generally be in relative equilibrium with the temperature and moisture content of the surrounding air in which it was harvested and/or is being stored. To reduce the crops moisture content that air has to be replaced with air at a reduced relative humidity. The most common way of achieving this goal is blowing heated air through and around the crop in a crop dryer. As a general, but rough, rule of thumb, for each 20° F. increase in air temperature results in a halving of the relative humidity of the heated air. If that heated air is then blown through and around the grain to be dried, it will extract moisture from the grain, thereby reducing the moisture content of the grain. There are a variety of various designs for crop dryers, but the vast majority rely upon the addition of heat to the drying air.

The typical fuel for heating the air is natural gas, if it is available for use at the storage location, or LP gas, typically propane, and of course, electricity may also be a fuel source for heating the drying air. Drying a crop is an energy intensive process, and inefficient since all that heated air is ultimately exhausted to atmosphere when moisture laden.

Another problem with using heated air for crop drying is the damage to the crop being dried if heated above certain temperatures. For example, while corn intended for use as cattle feed may be heated to about 180° F. without significant nutritional loss when used as cattle feed, but seed corn, to be used for next year's planting, cannot be heated to above 110° F. and preferably never above 105° F. If the corn crop is harvested in hot and humid conditions, the ambient temperature of the seed corn might be around 90° F. at the beginning of the drying process, and the upper limit temperature may be exceeded when heated air is introduced to dry the crop. These same problems of temperature limits are encountered with other types of grain crops too, for example rice, where the upper temperature limit may be 106° F., and if that limit is exceeded the rice kernels are degraded and the germs of the kernels may rupture.

There are low heat crop dryers found in the prior art, where ambient air is heated just a few degrees before being blown past the crop to be dried, but these systems often require days, if not weeks of continuous operation to adequately dry a crop, and may not always work adequately under high heat and humidity conditions.

The process of removing moisture from such commodities may be accomplished by closed-loop refrigeration methods. This involves forcing air over or through the subject product—i.e., the product from which moisture is to be removed—and then extracting moisture from the circulating air. The employed refrigeration systems typically include a heat pump, which comprises a condensing heat exchanger located outside of the crop dryer and an evaporator heat exchanger inside the crop dryer. Moisture from the circulating air adheres to the evaporator heat exchanger, thus lowering the relative humidity of the circulating air. After some time of operation, the moisture content of the subject product is reduced to a desired amount. But these systems cool a crop, and may not work efficiently if the crop to be dried is being stored in a cold climate, for example where the average ambient temperature of the crop in storage is 25° F. Frost damage can be encountered if a crop is dried using refrigeration under such conditions.

Another problem with prior art heat pump-based systems, however, is that the evaporator heat exchanger accumulates frost; and, at some point, the heat exchanger becomes so frosted that the evaporator coil no longer functions to remove moisture from the air. The typical solution to this frost issue is to cease operation of the heat pump in order to defrost the coil. This, of course, limits the effective operating time of the heat pump.

What is needed is a way of reducing the relative humidity of the drying air without significantly altering the temperature of the crop being dried either by the addition, or extraction, of heat from the drying air.

SUMMARY OF THE DISCLOSURE

The purpose of the summary description is to enable the public, and especially the scientists, engineers, and practitioners in the art who are not familiar with patent or legal terms or phraseology, to determine quickly from a cursory inspection, the nature and essence of the technical disclosure of the application. The summary description is neither intended to define the inventive concept(s) of the application, which is measured by the claims, nor is it intended to be limiting as to the scope of the inventive concept(s) in any way.

The moisture removal system includes a crop drying enclosure which has a grated or screened floor which allows drying air to be forced up through a crop to be dried. The moisture laden air then flows through air ducting to a moisture removal enclosure wherein moisture is removed, and from there through additional ducting back to the inlet of the crop drying enclosure. Contained within the moisture removal enclosure are first heat exchanger, a second heat exchanger, and third heat exchanger, along with an air blower. Air passes through at least two of the heat exchangers and then exits through a moisture removal air discharge back into additional air ducting and eventually into the drying enclosure inlet. This is a closed loop system and no additional air is introduced or needed during operation.

There are two cycles of operation for the heat exchangers at the heart of the moisture removal system. The moisture removal system incorporates, at its heart, a refrigerant compressor having a compressor inlet and a compressor outlet. The compressor outlet is operably connected to a compressor discharge line, which eventually connects to either the third heat exchanger supply line or the second heat exchanger supply line through a isolating first solenoid operating valve, which controls the flow into the third heat exchanger supply line or a second solenoid operated isolation valve, which selectively controls the flow into the second heat exchanger supply line. During the first cycle of operation, the first solenoid valve is open and a second solenoid isolation valve is closed. Also during this cycle of operation, a fourth solenoid isolation valve is closed, thus isolating the third heat exchanger supply line from supplying any hot refrigerant gases to the first heat exchanger thus ducting all of the hot gases through the third heat exchanger, which this operating cycle serves as a condenser. The partially condensed refrigerant flowing from the third heat exchanger then passes through a third heat exchanger discharge line, through a four-way valve and into the first heat exchanger supply line and into first heat exchanger, which permanently serves in both cycles of operation as a condenser. The now liquid refrigerant exiting from the first heat exchanger then flows through a discharge line which is interconnected through an open solenoid isolation valve to the thermal expansion valve, from where it flows into the second heat exchanger supply line. In this cycle of operation, the second heat exchanger is functioning as an evaporator, thus is removing moisture from the air circulating in the moisture removal system. The refrigerant gasses exhausting from the second heat exchanger pass through the second heat exchanger discharge line to and through the four-way valve and into the compressor suction line and back to the inlet of the compressor.

A drain pan is positioned beneath the second heat exchanger such that when the moisture removal system switches into its second cycle of operation the second heat exchanger will quickly defrost with the melting ice water being collected and ducted out of the system from the drain pan.

A timer is used as a switch means to switch cycles of operation back and forth between this first cycle of operation to the second cycle of operation summarized below. It should be apparent to those skilled in the art that other types of sensors can be used in conjunction with a switching means, such as pressure or temperature sensors.

In the second cycle of operation the compressor pumps hot compressed refrigerant gas from its discharge into compressor discharge line 40. In this cycle of operation, the first isolation solenoid valve is now closed and the second isolation valve is open, thereby directing the hot compressed refrigerant into the second heat exchanger supply line. During this mode of operation, a third isolation solenoid valve is closed, thus directing all of the hot gas refrigerant into the second heat exchanger, which in this cycle of operation is functioning as a second condenser. Partially condensed refrigerant exits from the second exchanger through the second heat exchanger discharge line and through the four-way valve and into the first heat exchanger supply line, which again is still functioning as a condenser. The now condensed refrigerant is ported into the first heat exchanger discharge line. In this second cycle of operation, the third isolation valve is closed and a fourth solenoid isolation valve is open, thus ducting the liquid refrigerant through the second thermal expansion valve and into the third heat exchanger supply line and through the third heat exchanger, which in this cycle of operation is now operating as an evaporator. The cycle is completed when the now gaseous refrigerant exiting from the third heat exchanger is then transported through the third heat exchanger discharge line to the four-way valve and then into the compressor supply line. Thus, in this second cycle of operation the third heat exchanger will frost up and eventually cease to function as an evaporator. At that point in time, the system then reverts back to cycle one, returning the second heat exchanger to its function as a condenser, thus defrosting the third heat exchanger Like the second heat exchanger, a condensate drain pan is provided to collect and divert out the condensed moisture condensate from the third heat exchanger.

In practice, the majority of the energy being used to extract the moisture is expended in the compressor, which is outside the moisture removal enclosure assembly. The only energy being added in the moisture removal enclosure assembly is that from the blower fan and that heat is negligible.

The net result is that the circulating air in the closed loops air circulation system remains essentially at the same temperature that it started at. Thus, if rice kernels were being dried and they were placed into the drying enclosure at an ambient temperature of 90° the moisture removal system can accomplish its task of removing the moisture without significantly increasing the ambient temperature of the rice crop being dried.

In a like manner, if the ambient air temperature of the crop was 20° F., for example seed corn that is going to be dried for use in the next planting season, then that crop will remain basically at the ambient temperature at which it was placed into the drying enclosure thus minimizing the amount of thermal energy exhausted to the atmosphere.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

DETAILED DESCRIPTION OF THE PREFERRED EMBODIMENTS

Figure 1:
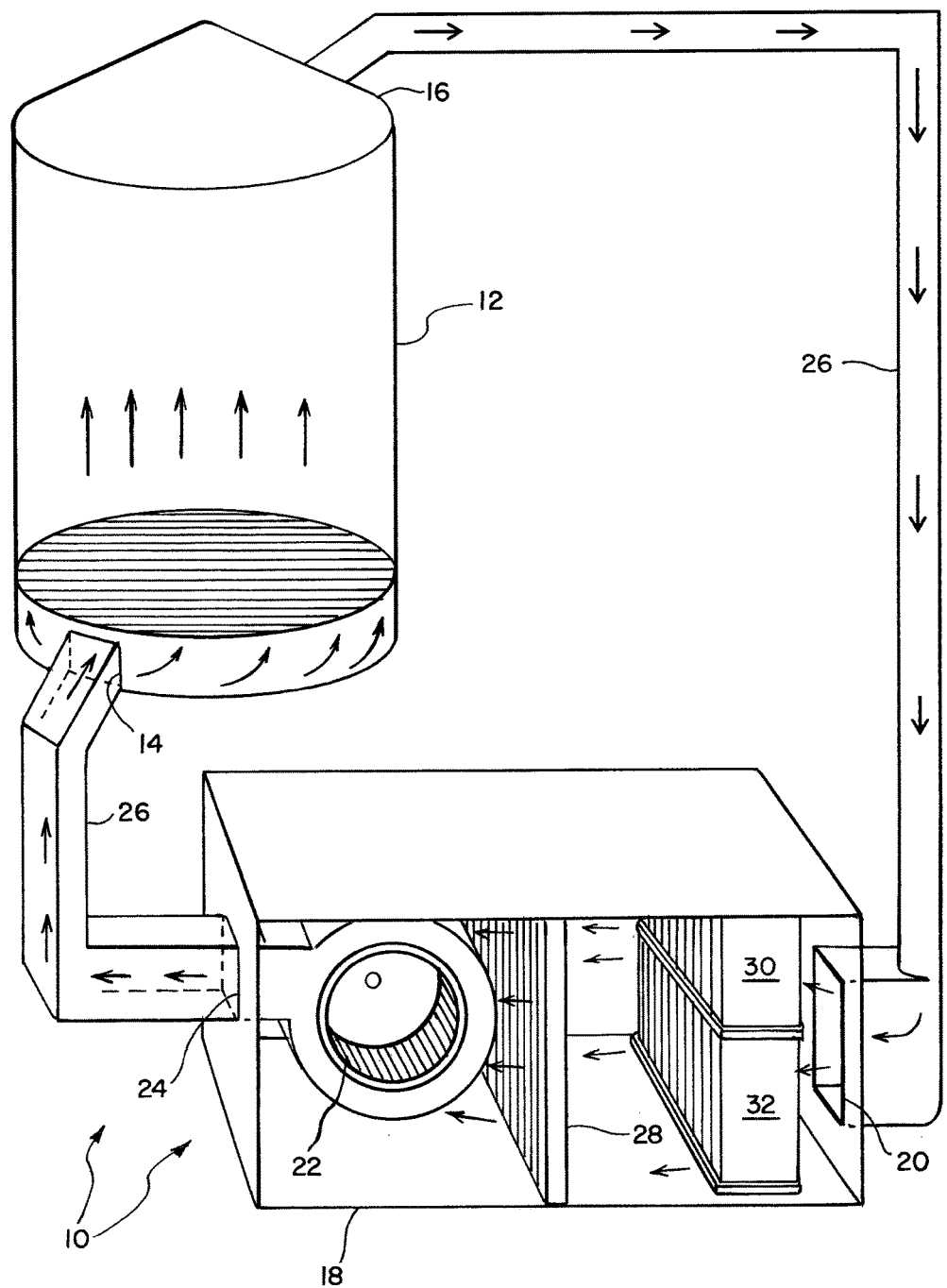
FIG. 1 is a perspective representational view of my new closed loop crop drying system.

While the presently disclosed inventive concept(s) is susceptible to various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Referring first to FIG. 1, there is shown a prospective representational view of the airflow system and location of the major components in my moisture removal system. The moisture removal system 10 comprises crop drying enclosure 12, which has a grated or screened floor which allows drying air to be forced up through a crop to be dried. The moisture laden air then flows in the direction of the arrows through air ducting 26 to moisture removal enclosure inlet 20 in moisture removal enclosure assembly 18. Contained within the moisture removal enclosure 18 are first heat exchanger 28, second heat exchanger 30, and third heat exchanger 32, along with air blower 22. Air passes through at least two of the heat exchangers and then exits through dried moisture removal air discharge 24 back into additional air ducting 26 and eventually into the crop drying enclosure inlet 14. The placement of air blower 22 within the moisture removal enclosure is merely a matter of design choice, as it could be located anywhere within the closed air circulation loop. This is a closed loop system and no additional air is introduced or needed during operation.

Figure 2:
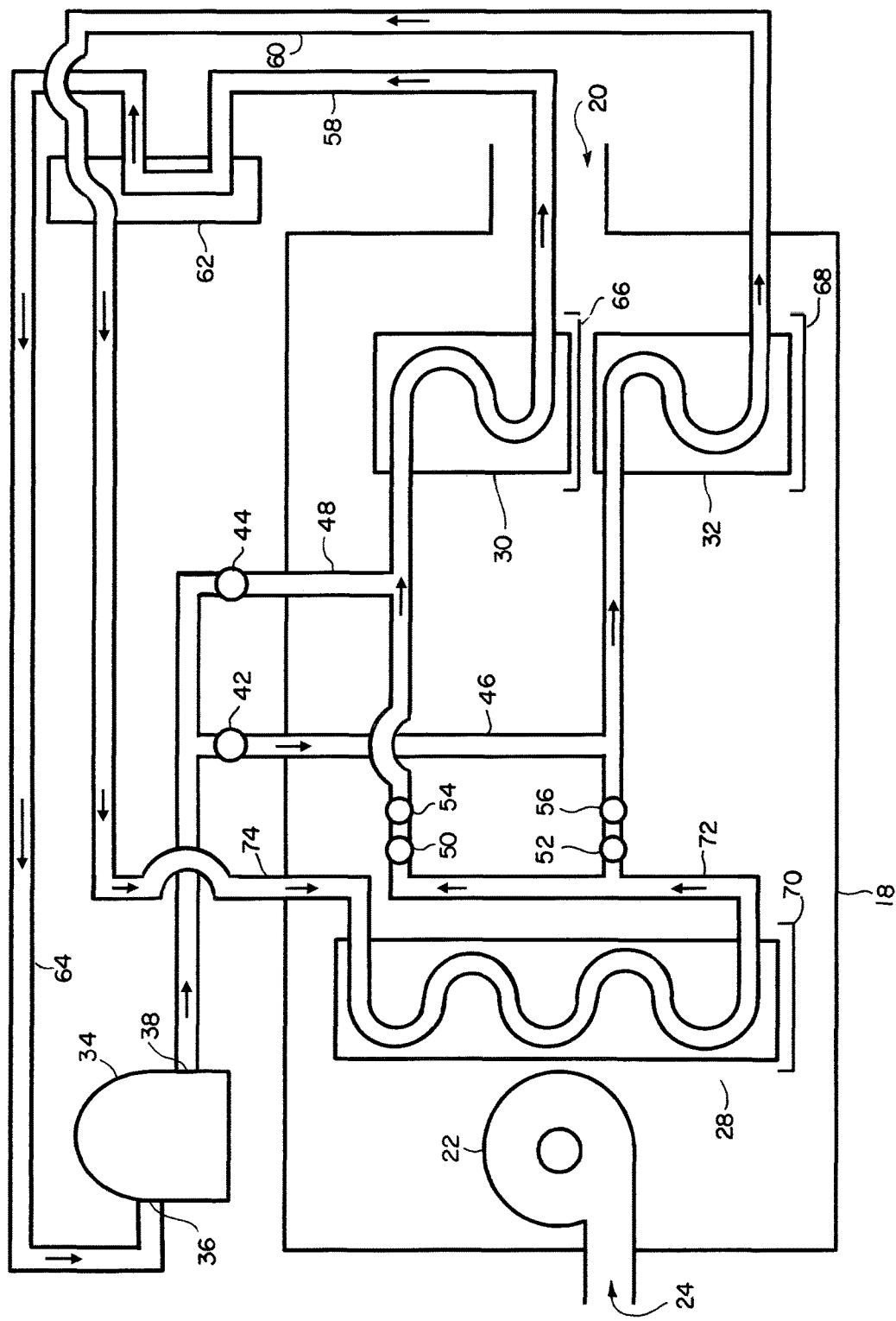
FIG. 2 is a schematic representation of the moisture removal section of my closed loop crop drying system operating in a first cycle of operation.

Referring now to FIG. 2, there is shown a first cycle of operation. It incorporates, at its heart, refrigerant compressor 34 having compressor inlet 36 and compressor outlet 38. Compressor outlet 38 is operably connected to compressor discharge line 40. Compressor discharge line 40 eventually connects to either third heat exchanger supply line 46 or second heat exchanger supply line 48 through isolating first solenoid operating valve 42, which controls the flow into third heat exchanger supply line 46 or second solenoid operated isolation valve 44, which selectively controls the flow into second heat exchanger supply line 48. During the first cycle of operation, first solenoid valve 42 is open and second solenoid isolation valve 44 is closed. Also during this cycle of operation, the fourth solenoid isolation valve 52 is closed, thus isolating the third heat exchanger supply line 46 from supplying any hot refrigerant gases to first heat exchanger 28 thus ducting all of the hot gases through third heat exchanger 32, which this operating cycle serves as a condenser. The partially condensed refrigerant flowing from third heat exchanger 32 then pass through third heat exchanger discharge line 60 through four-way valve 62 into first heat exchanger supply line 74 and into first heat exchanger 28, which permanently serves in both cycles of operation as a condenser. The now liquid refrigerant exiting from first heat exchanger 28 then flows through discharge line 72, which is interconnected through open solenoid isolation valve 50 to thermal expansion valve 54, from where it flows to second heat exchanger supply line 48. In this cycle of operation, second heat exchanger 30 is functioning as an evaporator, thus removing moisture from the air circulating in the moisture removal system. The refrigerant gasses exhausting from second heat exchanger 30 pass through second heat exchanger discharge line 58 through four-way valve 62 and into compressor suction line 64 and back to the inlet 36 of compressor 34.

Drain pan 66 is positioned beneath second heat exchanger 30 such that when the moisture removal system switches into its second cycle of operation, second exchanger 30 will quickly defrost with the melting ice water being collected and ducted out of the system from drain pan 66.

In the preferred embodiment, a timer is used as a switch means to switch cycles of operation back and forth between this first cycle of operation to the second cycle of operation described below. It should be apparent to those skilled in the art that other types of sensors can be used in conjunction with a switching means, such as pressure or temperature sensors.

Figure 3:
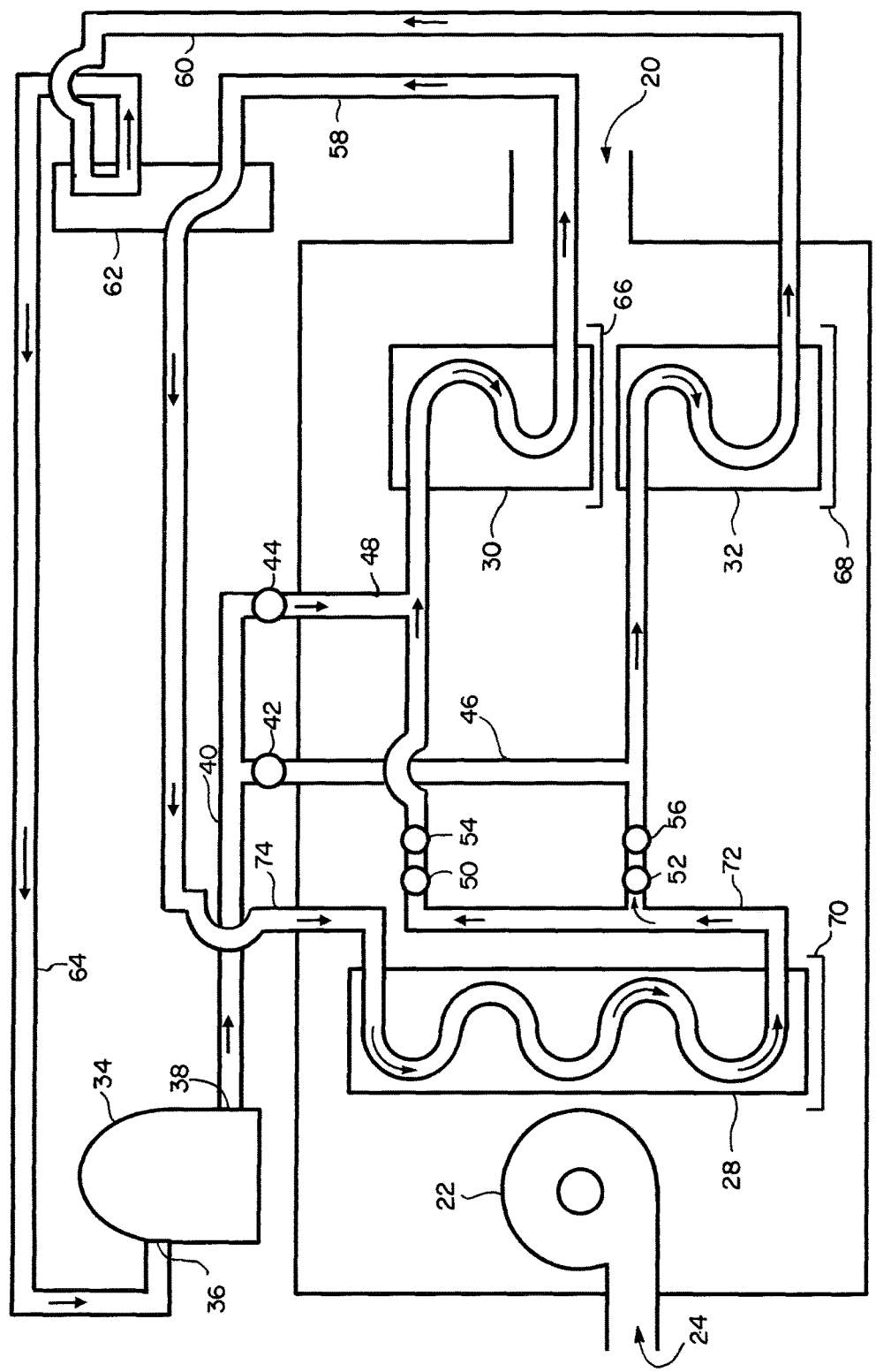
FIG. 3 is a schematic representation of the moisture removal section of my closed loop crop drying system operating in a second cycle of operation.

The second cycle of operation is described and shown in FIG. 3. Again, compressor 34 pumps hot compressed refrigerant gas from its discharge 38 into compressor discharge line 40. In this cycle of operation, first isolation solenoid valve 42 is now closed and second isolation valve 44 is open, thereby directing the hot compressed refrigerant into second heat exchanger supply line 48. During this mode of operation, third isolation solenoid valve 50 is closed, thus directing all of the hot gas refrigerant into second heat exchanger 30, which in this cycle of operation is functioning as a second condenser. Partially condensed refrigerant exits from second exchanger through second heat exchanger discharge line 58 and through four-way valve 62 and into the first heat exchanger 28, which again is still functioning as a condenser, through first heat exchanger supply line 74. The now condensed refrigerant is ported into first heat exchanger discharge line 72. In this second cycle of operation, third isolation valve 50 is closed and fourth solenoid isolation valve 52 is open, thus ducting the liquid refrigerant through second thermal expansion valve 56 and into the third heat exchanger supply line 46 and through third heat exchanger 32, which in this cycle of operation is now operating as an evaporator. The cycle is completed when the now gaseous refrigerant exiting from third heat exchanger 32 is then transported through third heat exchanger discharge line 60 to four-way valve 62 and then into compressor supply line 64. Thus, in this second cycle of operation third heat exchanger 32 will frost up and eventually cease to function as an evaporator. At that point in time, the system the reverts back to cycle one, returning the third heat exchanger 32 to its function as a condenser, thus defrosting third heat exchanger 32. Like second heat exchanger 30, condensate drain pan 68 is provided to collect and divert out the condensed moisture condensate from third heat exchanger 32.

In practice, the majority of the energy being used to extract the moisture is expended in compressor 34, which is outside the moisture removal enclosure assembly 18. The only energy being added in the moisture removal enclosure assembly 18 is that from the blower fan 22 and that heat is negligible.

The net result is that the circulating air in the closed loops air circulation system remains essentially at the same temperature that it started at. Thus, if rice kernels were being dried and they were placed into the drying enclosure 12 at an ambient temperature of 90° the moisture removal system can accomplish its task of removing the moisture without significantly increasing the ambient temperature of the rice crop being dried.

In a like manner, if the ambient air temperature of the crop was 20° F., for example seed corn that is going to be dried for use in the next planting season, then that crop will remain basically at the ambient temperature at which it was placed into drying enclosure 12, thus minimizing the amount of thermal energy exhausted to the atmosphere.

While certain preferred embodiments are shown in the figures and described in this disclosure, it is to be distinctly understood that the presently disclosed inventive concept(s) is not limited thereto, but may be variously embodied to practice within the scope of the following claims. From the foregoing description, it will be apparent that various changes may be made without departing from the spirit and scope of the disclosure as defined by the following claims.

I claim:

1. A moisture removal system comprising:
   a crop drying enclosure for holding a subject product, said crop drying enclosure having an air inlet and an air outlet;
   a moisture removal enclosure for removing moisture from circulating air, said enclosure having a moisture removal enclosure air inlet and a moisture removal enclosure air outlet;
   air ducting means for operatively connecting the moisture removal enclosure air outlet to the crop drying enclosure air inlet, and the crop drying enclosure air outlet to the moisture removal enclosure air inlet, to form a form a closed loop moisture removal air system;
   a compressor;
   a first heat exchanger capable of operation as a condenser positioned within the moisture removal enclosure;
   a second heat exchanger capable of operation as either an evaporator or a condenser positioned with the moisture removal enclosure;
   a third heat exchanger capable of operation as either and evaporator positioned within the moisture removal enclosure;
   a first expansion valve for coupling said first and second heat exchangers when said second heat exchanger is operating as an evaporator;
   a second expansion valve for coupling said first and third heat exchangers when said second heat exchanger is operating as an evaporator;
   a switching means for changing the respective function of said second and heat exchangers from operation as a condenser to evaporator or evaporator to condenser;
   wherein said compressor, first, second, and third heat exchanger, and expansion valves are each in fluid communication with one another by way of conduit means; and
   at least one blower mounted within one of said sections of air ducting for forcing air through the closed loop moisture removal system.

2. The moisture removal system of claim 1 which further comprises a four-way valve in fluid communication with said first, second, and third heat exchangers and the compressor.

3. The moisture removal system of claim 1 which further comprises a plurality of solenoid operated flow-controlling valves operable to switch from a first cycle of operation wherein the second heat exchanger functions as a condenser and the third heat exchanger as an evaporator to a second cycle of operation in which the second heat exchanger functions as an evaporator and the third heat exchanger functions as a condenser.

4. The moisture removal system of claim 3 wherein said switching means is controlled by a timer.

5. A moisture removal system comprising:
   a drying enclosure for holding a crop product, said drying enclosure having an intake side and an exhaust side;
   a moisture removal enclosure for removing moisture from circulating air, said enclosure having an inlet side and an outlet side and comprising a heat pump, which further comprises:
      a first heat exchanger having a condenser inlet, and a valve outlet;
      a second heat exchanger having a valve controlled inlet for receiving either hot compressed refrigerant gas or cold expanded refrigerant gas, and an outlet for connection to a four-way valve;
      a third heat exchanger having a valve controlled inlet for receiving either hot compressed refrigerant gas or cold expanded refrigerant gas, and an outlet for connection to the four-way valve;
      a four-way valve having a first heat exchanger inlet, a second heat exchanger outlet, a third heat exchanger outlet, and an compressor outlet;
      a first expansion valve having an inlet and an outlet;
      a second expansion valve having an inlet and an outlet;
      a plurality of flow-controlling solenoid operated valves; and
      a switching means operable to change the state of said flow-controlling devices and the four-way valve for changing the fluid operation of said heat pump to change the respective function of said second and third heat exchangers from condenser to evaporator or evaporator to condenser; wherein
      said suction inlet of said compressor is in fluid communication with said compressor outlet of said four-way valve compressor outlet by way of a conduit means;
      said discharge outlet of said compressor is in selective fluid communication with either the inlet of said second heat exchanger or the inlet of said third heat exchanger by way of a conduit means wherein each conduit means is controlled open or shut by at least one of said flow-controlling devices;
      wherein the outlets of both the second and third heat exchanges are in fluid communication with said four-way valve;
      said inlet of said first heat exchanger is in fluid communication with said first heat exchanger outlet of said four-way valve by way of a conduit means;
      said evaporator outlet of said first heat exchanger is in selective fluid communication with each of said inlet of said first expansion valve by way of a conduit means;
      said outlet of said first expansion valve is in fluid communication with said inlet of said second heat exchanger by way of a conduit means comprising at least one of said flow-controlling devices, and is in fluid communication with the inlet of said third heat exchanger by way of a conduit means comprising at least one of said flow-controlling devices;
   a first section of duct for conveying air from said drying enclosure to said moisture removal enclosure, said first section of duct connected between said exhaust side of said drying enclosure and said inlet side of said moisture removal enclosure;
   a second section of duct for conveying air from said moisture removal enclosure to said product container, said second section of duct connected between said outlet side of said moisture removal enclosure and said intake side of said drying enclosure; and
   at least one blower mounted within one of said sections of duct for forcing air through said product;
   wherein said drying enclosure and said moisture removal enclosure are in fluid communication with one another by way of said sections of duct.

6. The moisture removal system of claim 5 wherein said switching means comprises a timer.

7. The moisture removal system of claim 5 wherein said flow-controlling means are solenoids.

\* \* \* \* \*